Sept. 17, 1963 R. SABOURIN 3,103,934
HEATING DEVICE FOR SETTING HAIR AND PERMITTING
OF ACCELERATED DRYING
Filed Dec. 29, 1959
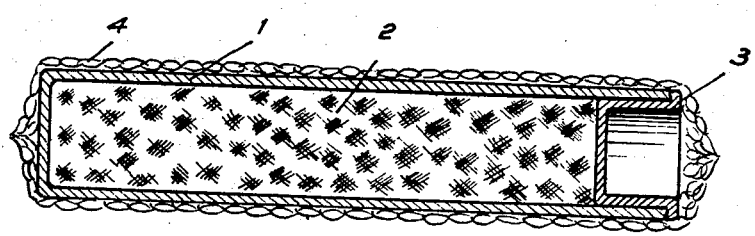
INVENTOR:
ROMOLA SABOURIN

United States Patent Office 3,103,934
Patented Sept. 17, 1963

3,103,934
HEATING DEVICE FOR SETTING HAIR AND PERMITTING OF ACCELERATED DRYING
Romola Sabourin, Sarcelles, Seine et Oise, France, assignor of one-third to Barbu Niculescu, New York, N.Y., and one-third to Nicolae Ionescu Desandre, Paris, France
Filed Dec. 29, 1959, Ser. No. 862,514
2 Claims. (Cl. 132—33)

The present invention has as object a heating device which is indefinitely re-usable, constituting a curling tool for setting hair in waves.

There are already known self-heating curlers for permanent waves, each incorporating a member provided with an inner recess intended to accommodate a removable or interchangeable cartridge containing a charge of product capable of giving rise to an exothermic reaction at the moment of use.

The charge may be either a system of two reagents, one of which is in the form of a dry substance whilst the other is a liquid, for example the combination CaO-water, or a redox system, composed of an oxidable product and a reducing product, for example the metallic aluminum-sodium persulfate system, which can be caused to react at the moment of use to provide an amount of heat equivalent to that released by the corresponding exothermic reaction.

However, the self-heating cartridges of this type, the functioning principle of which is based on irreversible exothermic reactions can be used only once and must be thrown away after use so that, in the long run, their use proves very expensive.

Moreover, the dimensions of the cartridges may be limited so that the exothermic charge must be excessively low for the curlers to have an acceptable size.

The present invention makes it possible to remedy these drawbacks and to produce an efficient and indefinitely re-usable heating device.

To this end, the heating device according to the invention comprises essentially a completely leak-proof receptacle, for example a cartridge, a tube, a container or other similar object containing a filling of a substance capable of releasing heat by reversible transformation process at the moment of use.

According to the preferred embodiment of the heating device according to the invention, the receptacle contains a substance capable of absorbing heat provided by an external source by a process of reversible transformation and of subsequently restoring this heat to the ambient medium by a process of inverse transformation.

The reversible transformation process may be a reversible physical transformation, for example a process of fusion-solidification, of evaporation-condensation, etc., such a transformation being accompanied by an absorption of heat in one of the directions of the transformation and by a release of heat in the other direction of the transformation.

In the same way, the process of reversible transformation may be a reversible chemical transformation, that is to say either a reversible chemical reaction which is endothermic in one of the directions of transformation and exothermic in the other, or a cyclic transformation entirely restoring the heat absorbed during the aforesaid transformation.

According to a particular embodiment of the invention, the substance used as a heat generator or as a heat accumulator is a compound which is solid at the ambient temperature, having a high latent heat in the molten state, a high specific heat and a suitable melting point, for preference less than 100° C.

The invention will be better understood if reference is made to the following description of a particular embodiment of the heating device according to the invention, capable of being used as a curler for setting hair.

The attached drawing shows a longitudinal cross-section through this embodiment.

If reference is made to the drawing, the heating device according to the invention comprises a tubular cartridge 1 of plastic material, for example polyethylene, inside which is accommodated a filling 2 of monohydrated caustic soda, the characteristics of which are the following:
Melting point 64° C.
Molten heat 80 calories/kg.

The cartridge is sealed by a stopper 3, which may, if need be, be welded to the aforesaid cartridge after the filling of soda has been incorporated.

The monohydrated soda may be used without distinction in the form of powder, crystals, flakes, grains or fragments. Use may likewise be made of anhydrous soda or sodium acetate, instead of the monohydrated soda or any other substance exhibiting the characteristics enumerated above.

Of course, the cartridge may be produced in a non-corrodible metal or a metal protected by a coating or by oxidation, etc., with regard to the substance utilised.

The heating device thus described may be used to advantage as a curler for setting hair.

To achieve this, the cartridge is surrounded by a cylindrical wrapping 4, which is inalterable and which facilitates winding-on and fixing the lock or hair.

At the moment of use, the curling device which has been manufactured in this way is plunged into a bath of hot water or into any other available external source of heat. The charge rapidly absorbs the heat provided by the bath of hot water, thus increasing its thermic potential, and it will change its physical state by melting if the temperature of this bath of heating water is higher than the melting point of the aforesaid charge.

The curler 1 is removed from the bath, drained if necessary, of water and then used as an ordinary curler to wave hair. The heat given off by the cartridge during the inverse change of physical state as the charge contained in the cartridge solidifies, is sufficient and is prolonged for a suitable period, to give satisfactory results. Thus, for example, a cartridge containing a charge of monohydrated soda, heated to 64° C., is capable of retaining a temperature of more than 40° C. for at least half an hour, which is amply sufficient to perform a complete hairset.

It is understood that the invention is not limited to the exact details of the foregoing description which is given solely by way of example and that various necessary modifications may be incorporated therein without however departing from the framework of the present invention. For example, instead of using a reversible transformation process of the melting-solidification type, one can employ a process of the evaporation-condensation type, or a process of reversible transformation such as that defined in the foregoing. In the same way, the form of the cartridge 1 may be modified in order to use the heating device according to the invention for other purposes.

Moreover, the raising of the temperature may be achieved elsewhere than in an external source of heat, for example an electrical resistance embedded in the cartridge and accessible by means of contact terminals.

Where detergent or toxic products such as soda are used, coloured indicators such as methylene blue, may be mixed with them in order to reveal any leakage, no matter how small, when the curler is plunged into water.

*Summary*

The present invention has an object an indefinitely re-usable heating device capable of being used in particular as a curler for setting hair, characterised by the following claims taken in isolation or in various combinations.

I claim:

1. A hair-setting device comprising a completely enclosed fluid tight tubular receptacle of plastic material defining a cylindrical form about which the hair is to be wound, said receptacle having an external diameter equal to the diameter of the curls to be formed in the hair, the exterior of said receptacle normally being free and unobstructed, a charge of a heat fusible substance within the receptacle having a melting point above normal room temperature and below 100° C., whereby the physical state of said substance is reversely transformable incident to absorption and release of heat, and a water soluble color indicator intermixed with said substance.

2. A device as defined in claim 1 wherein said heat fusible substance is sodium acetate.

References Cited in the file of this patent

UNITED STATES PATENTS

| | | |
|---|---|---|
| 182,521 | Garnham | Sept. 26, 1876 |
| 432,569 | Ryer | July 22, 1890 |
| 1,385,074 | Ferguson | July 19, 1921 |
| 1,400,305 | Miller | Dec. 13, 1921 |
| 1,449,288 | Killen | Mar. 20, 1923 |
| 1,589,183 | Leunis | June 15, 1926 |
| 1,892,571 | Goodwin | Dec. 27, 1932 |
| 2,074,816 | Trotter | Mar. 23, 1937 |
| 2,290,348 | Moule | July 21, 1942 |
| 2,677,664 | Telkes | May 4, 1954 |
| 2,876,818 | Raff et al. | Mar. 10, 1958 |